United States Patent [19]
Daneshrad et al.

[11] Patent Number: 5,930,267
[45] Date of Patent: Jul. 27, 1999

[54] FRAME SYNCHRONIZATION FOR ASYNCHRONOUS TRANSMISSION

[75] Inventors: Babak Daneshrad, Hackensack; Leonard J. Cimini, Jr., Howell, both of N.J.

[73] Assignee: Lucent Technologies Inc., Murray Hill, N.J.

[21] Appl. No.: 08/649,552

[22] Filed: May 17, 1996

[51] Int. Cl.⁶ .......................... H04L 12/28; H04L 12/56; H04J 3/06
[52] U.S. Cl. .......................... 370/509; 370/389; 375/355
[58] Field of Search .......................... 370/504, 514, 370/515, 509, 503, 389, 912, 913; 375/338, 348, 283, 330, 355, 363, 365, 367, 344, 362, 366, 345

[56] References Cited

U.S. PATENT DOCUMENTS 5,687,200  11/1997  Berger ..................................... 370/504

*Primary Examiner*—Douglas W. Olms
*Assistant Examiner*—David R. Vincent

[57] ABSTRACT

A method for transmission of a digital information packet. A synch word of a packet header of the packet is transmitted from a transmitter to a receiver over a distorting channel. During transmission of the synch word, transmission is interrupted by at least one bit time of quiescence of the transmitter. The synch word is received at the receiver. Based on a channel distortion characteristic determined for the received synch word, a preferred sampling point is determined for succeeding bits of the packet.

18 Claims, 5 Drawing Sheets

FRAME SYNCHRONIZATION FOR ASYNCHRONOUS TRANSMISSION

FIELD OF THE INVENTION

The invention relates to data transmission protocols, and more particularly to methods for synchronization for packets of digital data transmitted over a distorting asynchronous channel.

BACKGROUND OF THE INVENTION

In many data transmission methods, data are clustered into "packets," groups of bits that are transmitted in a burst. For example, a long message of one hundred thousand bits may be separated into one hundred packets of one thousand bits each. As each packet of the message is transmitted, a packet header is "attached" to the data of the packet, to serve as an "envelope" ensure the reliable delivery of the packet. The packet header includes a handful of bits that tell the receiver that a message is in progress and allows the receiver to synchronize to the transmitter. Optionally, the next few bits of the packet header identify the receiver (for instance, in a cellular phone system, many telephones in the area receive each packet broadcast from the transmitter, but each telephone only "pays attention" to those packets addressed to it), and possibly the sender (in the manner of a "return address" on a paper envelope), and other information to assist in packet delivery. The packet header is followed by the data bits of the packet (a thousand bits, in the example), conveying part of the actual message that the transmitter wants to send. After the packet is complete, the transmitter may wait a short time to allow some other transmitter a chance to transmit a packet. Then the transmitter sends the next packet, with its own packet header and packet body.

Referring to FIG. 1, it is known that the bits of a packet can be transmitted by modulating the phase of a transmission signal wave. For instance, the five bit message "11010" might be encoded by the wave form 100. The signal is transmitted as a wave of wavelength λ. The transmitted wave is divided into bit times of length b. (For ease of illustration, each bit in FIG. 1 is encoded in two wave periods, with sharp transitions at the boundaries between bit times b. In more typical applications, a single bit is encoded as several, tens, hundreds, or thousands of wave periods, with a more gradual transition between the wave forms representing the successive bits.) Each of the three One bits are transmitted by a wave with phase φ=π/4 (note that each of the One bits begins with the wave going down, at points 110, 112 and 114), and the Zero bits are transmitted by a wave with phase φ=5π4 (note that the Zero bits begin with the wave going up at points 116 and 118).

Referring to FIGS. 2a and 2b, a signal transmitted from a transmitter often arrives at the receiver in a distorted condition. FIG. 2a shows a wave as transmitted (the heavy line 200 indicates the envelope surrounding the higher frequency carrier wave 202). Note that the peaks 210 and zero crossings 212 occur at uniformly spaced time intervals. The wave arrives at the receiver, however, in a distorted condition as shown in FIG. 2b. For many transmission channels, for instance the radio transmissions used in cordless or cellular phones, the signal may travel from transmitter to receiver by several paths simultaneously, reflecting from walls, buildings, etc. Some paths take longer than others, so that the signal arriving by one path interferes with the signal arriving by another. In one familiar example, this "multipath distortion" may be visible as a television "ghost." In the distorted received signal 250, the peaks 260 and zero-crossings 262 of the received signal are not uniformly spaced as in the original, which makes it difficult for the receiver to recover the transmitted signal.

In digital transmission where each bit of the transmission is preceded and followed by other bits, multipath distortion causes the successive bits to smear into each other. A given reflection of a given bit may arrive at the transmitter simultaneously with other reflections of several other bits. This smearing is called "inter-symbol interference." Inter-symbol interference produces multiple ghosts, each time- and phase-shifted relative to the main signal. If the effects of multipath inter-symbol interference are not removed, the message may be decoded incorrectly.

A particular difficulty arises at the beginning of each packet, especially in transmission of digital data, whether the transmitted data are digitally-encoded voice communications, FAXes, or computer data. Because the crystal oscillators of the transmitter and receiver inevitably oscillate at slightly different frequencies, it is difficult for the receiver to identify the instant at which a transmission signal begins, and difficult to establish a synchronized agreement as to the time at which each subsequent bit begins. It is therefore difficult to identify the wave phase for given bits of the message. Because either the transmitter or receiver may be mobile, both the amplitude of the signal at the receiver and the multipath distortion characteristics of the transmission channel may vary from moment to moment, further complicating the recovery of the digital data from the received signal.

Referring to FIG. 3, one known packet header 300 includes several portions that consecutively allow the receiver to determine various characteristics of the received signal wave. Once all of these characteristics are determined, the receiver can "lock on" to the signal and receive actual data bits of the packet reliably. During a first portion 310 of the packet header, the amplitude of the wave gradually "ramps up," and the receiver detects that a transmission is in progress. During a second portion 312, the receiver recovers the frequency of the carrier wave. During second portion 312, circuitry in the receiver is tuned to match the receiver's carrier frequency to that of the transmitter (so that the transmitter and receiver precisely agree on the wavelength λ of FIG. 1). This is called "carrier recovery." During a third portion 314, the automatic gain control (AGC) of the receiver operates to compensate for varying signal strength (for instance, if the receiver is moving away from the transmitter, the receiver amplification gain is increased to compensate for the gradual decrease in signal strength). During a fourth portion 318, during receipt of a "synch word," the receiver chooses a point to sample the wave for each bit, and establishes a sampling clock at which future bits of the packet will be sampled. During a fifth portion 320, equalizer training data are received, and the receiver calibrates or "trains" the equalizer (another component of the receiver that filters out distortion in the received signal) to recognize and remove the inter-symbol interference from the received signal. It is only after all five of these overhead portions 310–320 of the packet header have been transmitted, and the receiver has calibrated itself to the signal, that the actual data 322 of the packet can be properly received.

Both synch word 318 and equalizer training data 320 are sequences of bits pre-agreed between the transmitter and receiver, and are typically the same for each packet transmitted. For instance, known systems use a Barker or PN sequence. Because of the inter-symbol interference described above in connection with FIG. 2b, each bit interval b will be somewhat smeared with parts of the signal from previous or following bits. During the synch word, the receiver compares the signal it actually receives to the signal that it knows was transmitted to rate out the multipath echoes from the strongest signal, and then chooses a time relative to the beginning of each interval b at which the signal for the respective bit is at its strongest, relative to the inter-symbol interference introduced from previous or following bits. Specifically, the receiver convolves the received signal with a constructed ideal signal to extract the impulse response of the channel; the maximum of is impulse response marks the preferred sampling time for each bit.

It is known to transmit multiple copies of the synch word bits. If the agreed synch word is, for instance, the bits "11010", the transmitter and receiver might pre-agree that the synch word is to be transmitted in triplicate, e.g., "111 111 000 111 000," so that the receiver can more accurately select a preferred sampling point.

SUMMARY OF THE INVENTION

The invention improves the efficiency with which a transmitter and receiver establish synchronization during transmission of digital data over a distorting channel. A receiver and transmitter according to the invention can more quickly and reliably find the synch word, and more quickly complete the packet header tasks of synchronizing to a common carrier frequency, amplitude, and phase, in spite of distortion in the transmission channel. Accordingly, transmission time of a message is reduced, and reliability is improved.

In general, the invention features a method and apparatus for transmission and reception of a digital information packet. In one aspect, a synch word of a packet header is transmitted from a transmitter to a receiver over a distorting channel. During transmission of the synch word, transmission is interrupted by at least one bit time of quiescence of the transmitter. The synch word is received at the receiver. Based on a channel distortion characteristic determined for the received synch word, a preferred sampling point is determined for succeeding bits of the packet.

Preferred embodiments of the invention may include one or more of the following. The synch word bits may be modulated onto the carrier signal using a phase differential encoding. As the synch word is received, the received wave form may be compared to a generated ideal wave form of the synch word to determine the inter-symbol interference characteristic of the channel. The comparing may be performed by convolving the received wave form with the ideal generated wave form to produce a transfer characteristic of the channel that describes the inter-symbol interference of the channel, and determining a maximum of the transfer characteristic. Once the transfer characteristic is determined, a sampling element of the receiver may be configured to sample the received wave form of the digital information packet at a time corresponding to the maximum. The received signal may be passed through a limiter before determining the maximum of the interference characteristic. The convolving, determining, and configuring steps may at least partially overlap in time with a further step of calibrating an automatic gain control to a power level of the received wave form. The synch word may comprise either a Barker or a PN sequence.

Embodiments of the invention may provide one or more of the following advantages. The total amount of time required to transmit synchronization information is reduced. Specifically, the functions of carrier recovery, automatic gain control, and synch word detection can be performed simultaneously. Synch word detection becomes less sensitive to fluctuations in the carrier frequency while the carrier recovery loop is converging, thereby allowing carrier recovery to proceed in parallel with synch word detection. Synch word detection becomes less sensitive to variations in the automatic gain control loop, thereby allowing automatic gain control to be performed in parallel with synch word detection. In a burst mode transmission, the receiver can readily ascertain a preferred sampling time for bits of the message. The invention allows the use of differential detection in environments with inter-symbol interference.

Additional advantages and features of the invention will be seen in the following description and the figures.

DETAILED DESCRIPTION OF PREFERRED EMBODIMENTS

Figure 4:
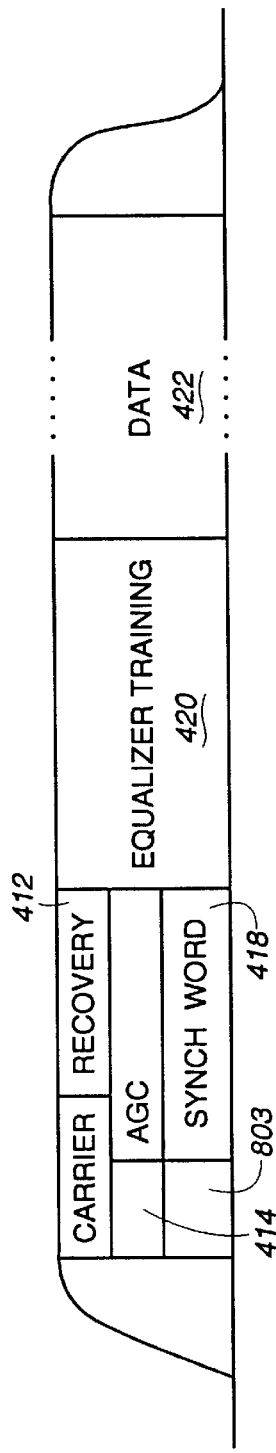
FIG. 4 shows a data packet according to the invention.

According to one embodiment of the invention, a transmitter transmits a packet shown in FIG. 4 of a message to a receiver. The packet has a header consisting of a predetermined sequence of bits including a synch word 418, shown in greater detail in FIG. 5. As the transmitter transmits the bits of the header, some of the bits 502–510 of the synch word of the header are separated by quiescence 520 of the transmitter. In other words, the transmitter is quiet during these periods. Devoting some of the packet transmission time to quiescence allows the receiver to more efficiently determine distortion characteristics of the transmission channel (particularly inter-symbol interference characteristics), and synchronize to the transmitter.

Figure 3:
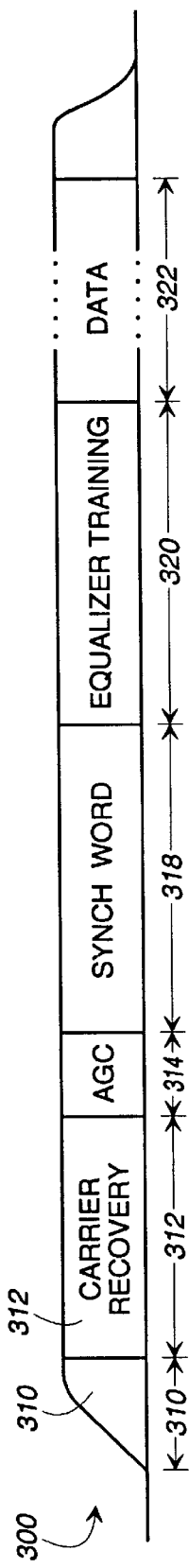
FIG. 3 shows a conventional data packet.

Referring to FIG. 4, the invention permits several of the functions that were performed serially by a conventional packet header (FIG. 3) to be performed simultaneously such that the portions of the packet header driving each of these functions are merged. In particular, the quiescent bit separation of the invention allows carrier recovery 412 (determination of the frequency of the transmitted wave) and AGC 414 (automatic gain control) to be driven by the synch word 418, instead of by data (312, 314 of FIG. 3) reserved for that purpose. Equalizer training 420 and the data of the packet body 422 then follow.

Figure 5:
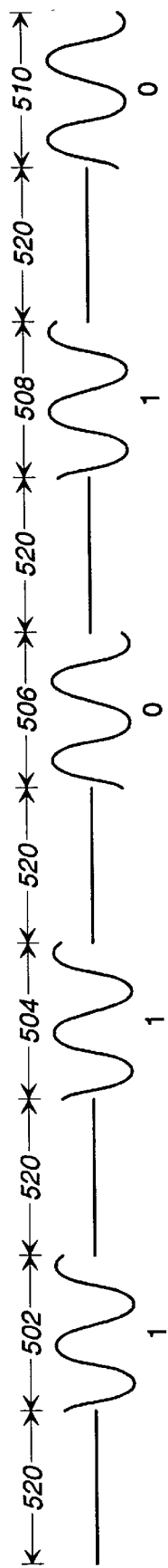
FIG. 5 is a wave form of a synch word of the packet of FIG. 4.

Referring to FIG. 5, in the invention the synch word is transmitted using QAM (quadrature-amplitude modulation), but with quiescent periods inserted between the bits as noted above. (For simplification of the drawing, each bit is shown encoded as two wave periods. Actual implementations might use several periods per bit.) In addition to encoding the bits of the synch word in the conventional way, that is, encoding successive pairs of One and Zero bits as sine and cosine components of amplitude +1 and −1, the quiescent periods are encoded as bit times with zero amplitude. For instance, a synch word of "1010" might conventionally be encoded as $$1+j1, \quad 1+j1, \quad -1-j1, \quad 1+j1, \quad -1-j1$$
$$1 \qquad 1 \qquad 0 \qquad 1 \qquad 0$$

Figure 1:
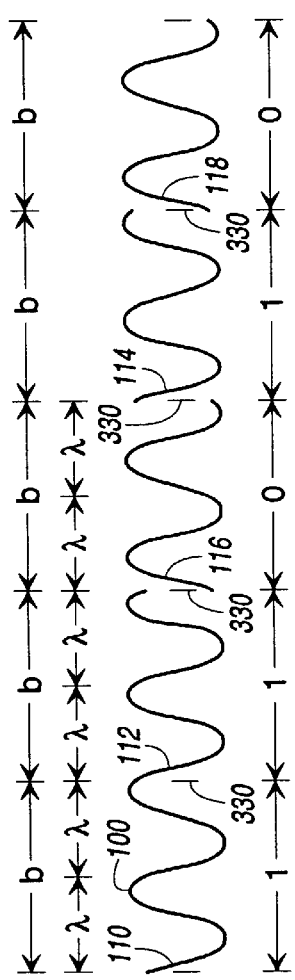
FIG. 1 shows a wave form for transmitting bits of a message.

(This conventional synch word was shown in FIG. 1, where the One bits 110, 112 and 114 were encoded with phase $\phi=\pi/4$, and the Zero bits 116, 118 were encoded with phase $\phi=5\pi/4$. In one embodiment of the invention, the synch word might be encoded with one bit time of quiescence between each pair of bits of the synch word:

$$0+j0, \quad 1+j1, \quad 0+j0, \quad 1+j1, \quad 0+j0,$$
$$\qquad\qquad 1 \qquad\qquad\qquad 1$$

$$-1-j1, \quad 0+j0, \quad 1+j1, \quad 0+j0, \quad -1-j1$$
$$0 \qquad\qquad\qquad 1 \qquad\qquad\qquad 0$$

The wave form for this embodiment is shown in FIG. 5. Note that the One bits 502, 504, 508 are encoded with phase $\phi=\pi/4$, and the Zero bits 506, 510 are encoded with phase $\phi=5\pi/4$. The quiescent periods 520 of zero amplitude separate the bits carrying the actual data of the synch word 502–510. Alternatively, the synch word might be transmitted with two quiescent times between bits.

Figure 2B:
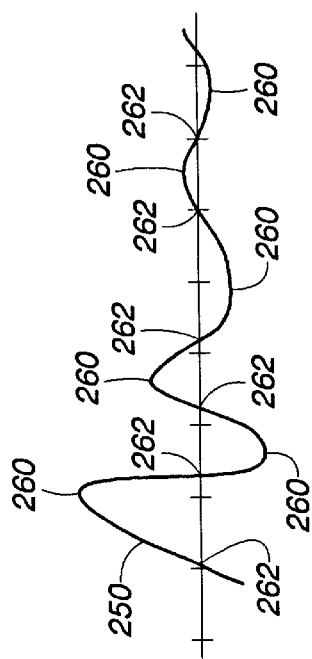
FIG. 2b shows the wave form of FIG. 2a as it might be received by a receiver after transmission through a distorting channel.
Figure 2A:
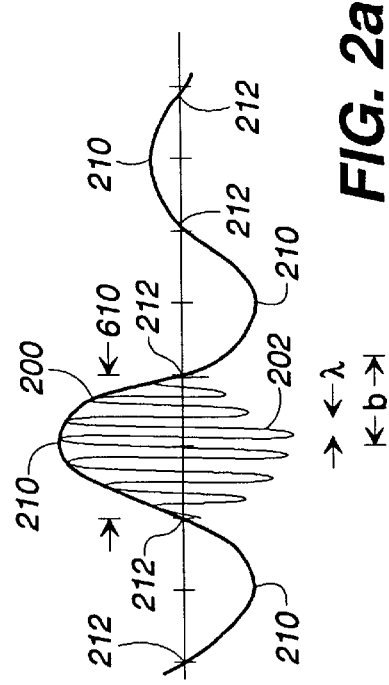
FIG. 2a shows a representative wave form as transmitted by a transmitter.
Figure 6:
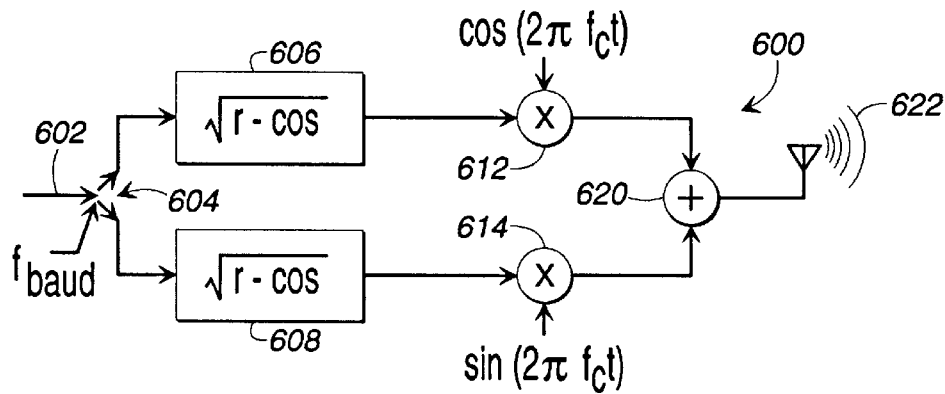
FIG. 6 is a block diagram of a transmitter.

FIG. 6 shows a transmitter 600. The bits to be transmitted arrive at input terminal 602 at frequency $2f_{baud}$. Every other bit is sent alternately up or down by commutator 604 (switching at $f_{baud}$). The bits are converted to square root-raised cosine pulse shapes at 606, 608. The pulses are of finite width with zero corssings every $1/f_{baud}$ seconds (610 of FIG. 2a), and of amplitude +1 or −1 to indicate a value of One or Zero. The pulses are multiplied respectively by cosine and sine waves at the carrier frequency $f_c$. As a result, each bit is encoded as shown in FIG. 2a, a decaying sinusoid envelope over a high frequency carrier. The top and bottom rails are added at adder 620, to form a QAM (quadrature amplitude modulation) encoding of successive bits. The sum signal 622 is transmitted over the channel.

The bits arriving at terminal 602 are encoded as conventional pulses with +1 or −1 amplitudes. In addition, 0 amplitude bits are inserted to indicate the quiescent spaces between bits of the synch word.

Figure 7:
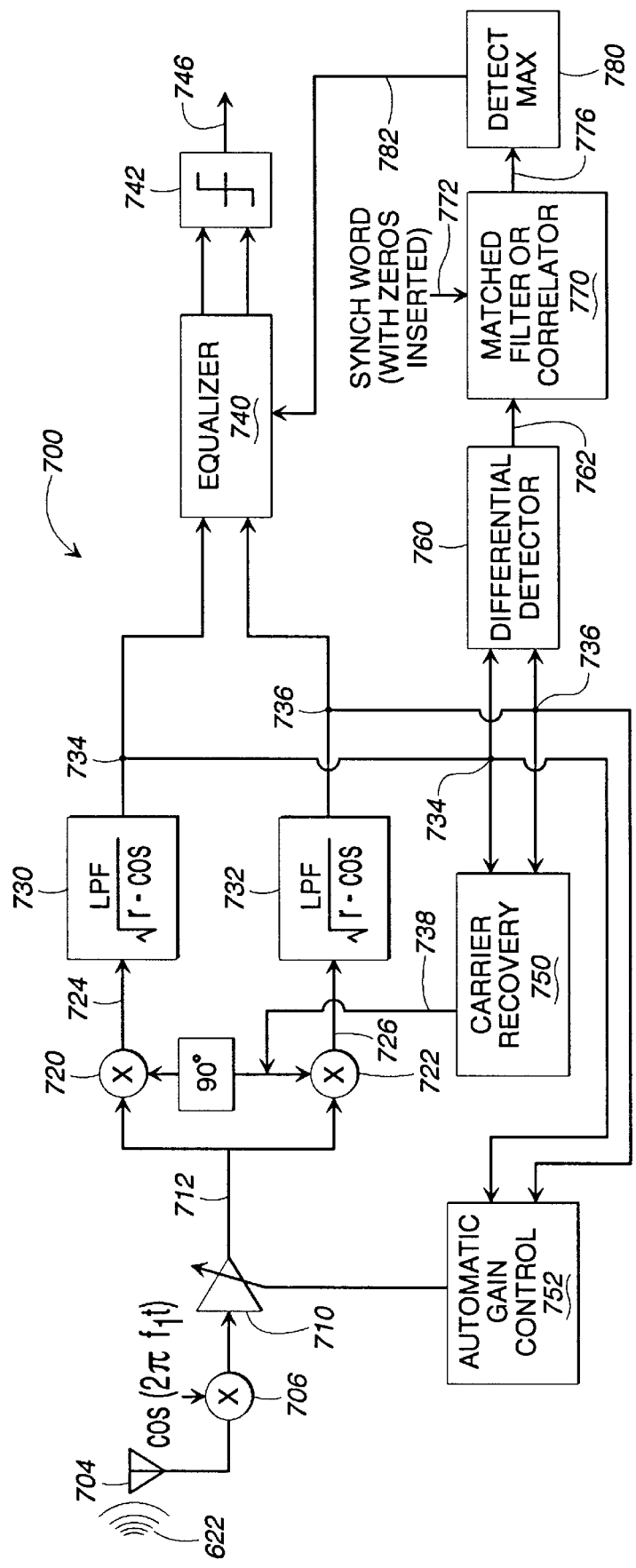
FIG. 7 is a block diagram of a receiver.

FIG. 7 shows a receiver 700. Transmitted signal 622 arrives at antenna 704. The received signal is multiplied 706 by $\cos(2\pi f_1 t)$ to bring it down to an intermediate frequency $f_{IF}=f_c-f_1$. Variable gain amplifier 710 effects the automatic gain control, ensuring that the signal power level at point 712 is constant, irrespective of the power level of received signal 622. At multipliers 720, 722, the signal is multiplied by $\cos(2\pi f_{IF} t)$ and $-\sin(2\pi f_{IF} t)$, respectively. The product signals 724, 726 have components centered at zero frequency and components at frequency $2f_{IF}$. Square root raised-cosine low pass filters 730, 732 pass only the low-frequency components. Thus, at nodes 734 and 736, the two signals are $b\cos(\Delta\theta)+a\sin(\Delta\theta)$ and $a\cos(\Delta\theta)+b\sin(\Delta\theta)$ respectively, where a and b are the values of two bits that were transmitted simultaneously as cosine and sine components of the wave, and $\Delta\theta$ is the phase disagreement between received wave 622 and the receiver's synthesized carrier 738. After signals 734, 736 are processed by equalizer 740, the result is analyzed by slicer 742 to produce a stream of received data bits 746.

For a decision-directed carrier recovery loop, signals 734 and 736 are also fed back through a carrier recovery loop 750 (which acts during carrier recovery time, 412 of FIG. 4, to bring the receiver's synthesized frequency $f_c$ and phase into agreement with that of received signal 622, thereby driving $\Delta\theta$ to zero at multipliers 720, 722), and to automatic gain control 752, which in turn controls variable amplifier 710. (This is merely one way to perform carrier recovery; others exist as well.)

Signals 734, 736 are also processed by differential detector 760 to form signal 762. (Differential detection is discussed in connection with FIG. 8, below). Correlator 770 convolves signal 762 with an ideal generation 772 of the synch word (with the zeros inserted) to produce signal 776. Box 780 detects the maximum of signal 776. This maximum point is the point at which the signal 734, 736 should be sampled to minimize inter-symbol interference. Output 782 of "detect max" box 780 is fed to equalizer 740 to instruct it to start its adaptation procedure.

It is preferred to use a Barker sequence or a PN sequence for the data bits of the synch word (318 of FIG. 3 or 418 of FIG. 4), the bits of the Barker or PN sequence separated by one or more bits of quiescence (520 of FIG. 5).

Figure 8:
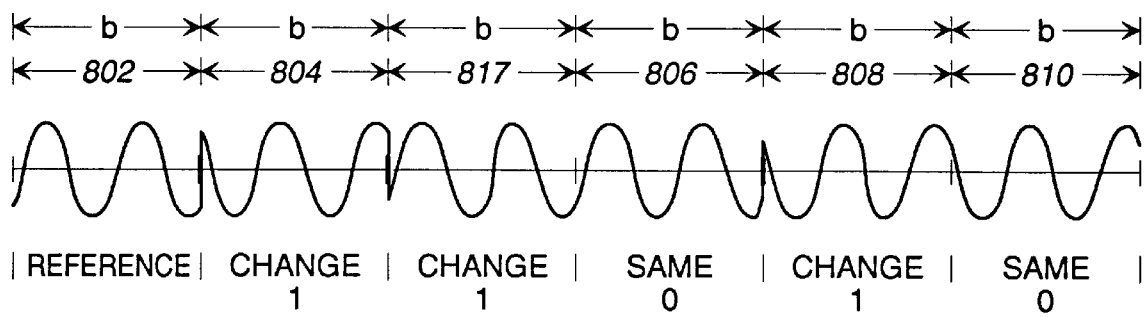
FIG. 8 shows a wave form and differential encoding of bits of a message.

Referring to FIG. 8, the invention overcomes some of the difficulties conventionally encountered in the use of differential encoding. Especially at the beginning of a packet, the receiver is in only approximate agreement with the carrier frequency generated by the transmitter (due to the slight disagreement between the crystals driving the transmitter and receiver, as discussed in the Background). This uncertainty makes it difficult to determine the absolute phase of individual bits of the signal, and therefore difficult to determine the 1's and 0's of a received signal. To reduce the effects of this carrier frequency offset, in conventional transmitters and receivers, it is preferred to use an alternate method of encoding from the absolute encoding shown in FIGS. 1 and 5. In this alternate method, called differential encoding, the 1's and 0's are encoded in the phase shift from one bit to the next, rather than in the absolute phase. For instance, in the simple example of FIG. 8, a One bit is encoded as a phase reversal, and a Zero bit is encoded as a phase preservation. For instance, the synch word "11010" might be encoded in the wave 800 of FIG. 8. A prefix portion 802 establishes a phase reference. (In the packet of FIG. 4, this reference prefix might be established during portion 803 of the packet, immediately before the beginning of synch word 418.) Then every bit time b encoding a One (804, 808, 812) is encoded by reversing the phase of the wave relative to the previous bit, and every bit time b encoding a Zero (806, 810) is encoded as with the same phase as the previous bit. A differential decoder (e.g. 730 of FIG. 7), then, determines the phase shifts in successive bits, and determines the bits of the message word from those shifts, rather than trying to establish the absolute phase of the wave during each bit time.

Differential detection performs poorly in the presence of inter-symbol interference, because the effect of inter-symbol interference on a wave is to modify its phase. The invention overcomes this difficulty since the quiescent bit times separating the synch word generate relatively little interference with the actual data bits of the synch word, and separate the bits from each other so that the remaining interference is relatively attenuated. During receipt of the synch word, a best time to sample is established (752 of FIG. 7). This reduces the sensitivity of the receiver to inter-symbol interference, and thereby reduces the disadvantages in conventional use of differential encoding.

Figure 9A:
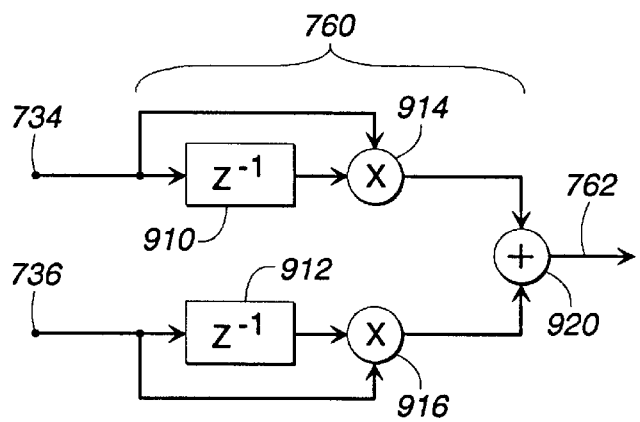
FIGS. 9a and 9b are block diagrams of differential detectors.
Figure 9B:
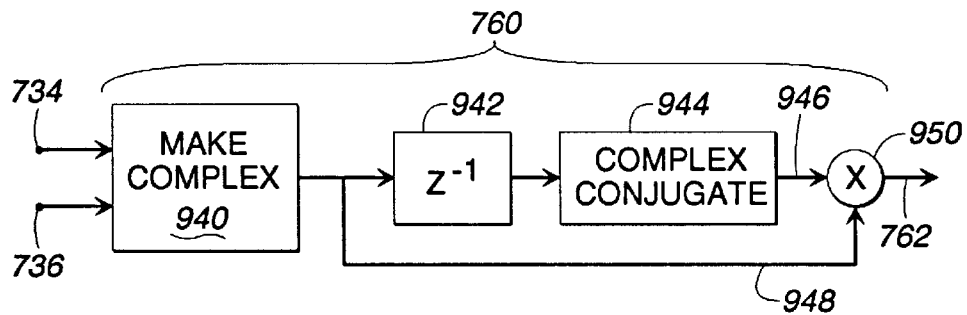

Referring to FIGS. 9a and 9b, two differential detectors are preferred for use with the invention (block 760 of FIG. 7). A first embodiment, shown in FIG. 9a, takes as its inputs two signals 734, 736. Each of these signals is delayed one baud time b 910, 912, and multiplied by the original signal 914, 916. These two product signals are then summed 920 to produce an output 762. A second embodiment is shown in FIG. 9b, and is an alternative to the embodiment of FIG. 9a. In this second embodiment, the two inputs 734, 736 are combined 940 to form a complex value 948. Complex value 948 is delayed 942 one baud time, and the complex conjugate formed 944. The delayed conjugate 946 and original complex value 948 are multiplied 950 to produce an output 762.

Referring again to FIG. 7, correlator 770 can be replaced with a regular FIR filter whose coefficients 772 are the bits of the spectrum of the synch word (with the insertion of the zero-amplitude bit periods). Filter 770 could be of other alternative shapes that would maximize the probability of correct synchronization.

Figure 10:
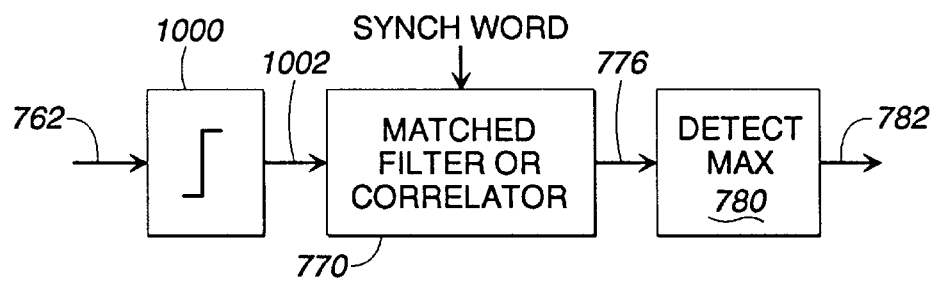
FIGS. 10 and 11 are block diagrams showing details of alternate embodiments of the invention.

Referring to FIG. 10, a limiter 1000 can be inserted into the receiver of FIG. 7, between differential detector 760 and matched filter or correlator 770. This embodiment reduces the sensitivity of the output 782 to variations in the AGC loop (752 of FIG. 7). Recall that the AGC (automatic gain control) regulated the power level at node 712 of FIG. 7. If the AGC loop is fluctuating, then the input to max detector 780 is unstable, and a maximum in the channel response function 776 cannot be detected. Limiter 1000 generates only a +1 output if its input is greater than zero and a −1 output if its input is less than zero. The output 1002 of limiter 1000 will thus have these fluctuations damped out, and sensitivity of the correlator/detector 770, 780 is reduced. This approach allows synchronization detection to be performed concurrently with automatic gain control. The limiter significantly reduces the hardware complexity, though at a reduced system performance.

Figure 11:
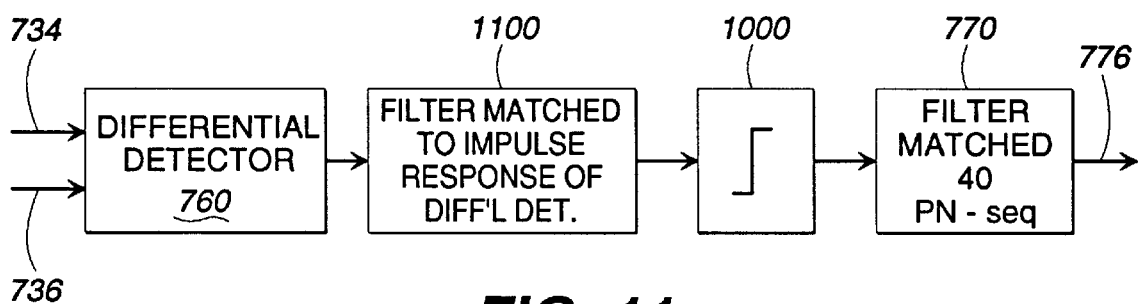

Referring to FIG. 11, a filter 1100 could be inserted following the differential detector, to improve the performance of the frame synchronization detection. Filter 1100 would have an impulse response identical or close to the impulse response of differential detector 760. Optionally, a limiter 1000 (as described above in connection with FIG. 10) could follow filter 1100.

Preferred methods of carrier recovery and differential detection, and matched filters, are described in these references: John G. Proakis: "Digital Communications," 2nd Ed., Mc Graw Hill, 1989; S. Benedetto, E. Biglieri, and V. Costellani: "Digital Transmission Theory," Prentice Hall 1987; and R. D. Gitlin, J. F. Hayes, and S. B. Weinstein: "Data Communications Principles," Plenum Press, 1992; each of which is incorporated herein by reference.

It is to be understood that the above description is only of the preferred embodiments of the invention. Numerous other arrangements may be readily understood by one skilled in the art, without departing from the scope of the invention. The invention is thus limited only as defined in the accompanying claims.

We claim:

1. A method for transmission of a digital information packet, the method comprising the steps of:

transmitting a synch word of a packet header of said packet from a transmitter to a receiver over a distorting channel, transmission of said synch word being interrupted by at least one bit time of quiescence of the transmitter; and at said receiver, receiving said synch word and based on a channel distortion characteristic determined for said received synch word, determining a preferred sampling point for succeeding bits of said packet.

2. The method of claim 1, further comprising the step of:

at said receiver and at least partially overlapping in time with said receiving and determining of said preferred sampling point, calibrating an automatic gain control to a power level of said received synch word.

3. The method of claim 2, wherein said synch word is modulated onto a carrier signal using a phase differential encoding.

4. The method of claim 3, further comprising the step of:

decoding said phase differential encoding of said received synch word; and then passing said received synch word through a limiter before said determining of said preferred sampling point.

5. The method of claim 1, further comprising the step of:

at said receiver, and at least partially overlapping in time with said receiving and determining of said preferred sampling point, acquiring a carrier frequency of said transmitter.

6. The method of claim 5, wherein said synch word is modulated onto a carrier signal using a phase differential encoding.

7. The method of claim 5, further comprising the step of:

in said receiver, after decoding said differential encoding, passing said received synch word through a filter configured to improve a probability of correctly synchronizing said receiver to said transmitter.

8. The method of claim 7, wherein said filter has coefficients conforming to the bits of said synch word.

9. The method of claim 7, wherein said synch word is modulated onto a carrier signal using a phase differential encoding.

10. The method of claim 1, wherein said comparing further comprises the steps of:

convolving said received synch word with a generated ideal synch word to determine a response characteristic of said channel; and determining said preferred sampling point based on said response characteristic.

11. The method of claim 1, further comprising the steps of:

filtering said received synch word through a filter configured to produce a response characteristic of said channel;

determining a maximum of said response characteristic; and configuring a sampling element of said receiver to sample said received waveform of the digital information packet at a time corresponding to said maximum.

12. The method of claim 11, further comprising the steps of:

modulating said synch word onto a carrier signal using a phase differential encoding; and passing said received synch word through a limiter, after decoding said differential encoding and before said determining of said maximum.

13. The method of claim 1, wherein said synch word comprises a Barker sequence.

14. The method of claim 1, wherein said synch word comprises a PN sequence.

15. Within a receiver for a digital information packet, a signal acquisition analyzer configured to analyze a synch word of a header of said packet, comprising:
   a component for synthesizing a description of a waveform of bits of said synch word, said description including a description of zero-amplitude portions of said synch word; and
   a component for determining an inter-symbol interference characteristic of a transmission channel, based on an analysis of a received waveform of said synch word relative to said synthesized waveform description.

16. The signal acquisition analyzer of claim 15, further comprising:
   a convolution element for convolving said received waveform with said synthesized description to produce a response characteristic of said channel; and
   a sampling element of the receiver configured to sample said received waveform at a preferred time, said preferred time determined from said interference characteristic.

17. The signal acquisition analyzer of claim 15, further comprising:
   a filter having a shape corresponding to a spectrum of said synch word, including said zero-amplitude portions; and
   a sampling element of the receiver configured to sample said received waveform at a preferred time, said preferred time determined from said interference characteristic.

18. A method for transmitting and receiving a digital information packet, the method comprising the steps:
   transmitting a synch word of a header of the packet from a transmitter to a receiver over a distorting channel, said synch word being configured to allow the receiver to acquire characteristics of a signal carrying the packet, and bits of said synch word being encoded by modulation of a carrier signal, transmission frequencies and bit transmission rates of the transmitter and receiver being approximately agreed at the beginning of the transmission, the synch word comprising a pre-agreed sequence of bits, transmission of the synch word being interrupted by at least one bit time of quiescence of the transmitter;
   receiving a waveform of said synch word at said receiver;
   comparing said received waveform to a synthesized ideal waveform of said synch word to determine a response characteristic of said channel, said comparing comprising at least one of the two steps of:
   convolving maid received waveform with said ideal generated waveform, and
   filtering said received waveform through a filter whose shape approximates a spectrum of said ideal waveform;
   configuring a sampling element of said receiver to sample said received waveform of the digital information packet at a preferred time, said preferred time determined relative to a maximum of said response characteristic; and then
   transmitting from the transmitter to the receiver a body of the packet, the body including information to be conveyed from the transmitter to the receiver;
   wherein said comparing and configuring steps at least partially overlap in time with a further step of calibrating an automatic gain control of said receiver to a power level of said received waveform.

* * * * *